(12) United States Patent
Haaf et al.

(10) Patent No.: US 9,494,162 B2
(45) Date of Patent: Nov. 15, 2016

(54) AXIAL FAN WITH ADDITIONAL FLOW CHANNEL

(75) Inventors: Oliver Haaf, Kupferzell (DE); Christian Haag, Mulfingen (DE); Sven Walter, Rengershausen (DE)

(73) Assignee: EBM-PAPST MULFINGEN GMBH & CO. KG, Mulfingen (DE)

( * ) Notice: Subject to any disclaimer, the term of this patent is extended or adjusted under 35 U.S.C. 154(b) by 397 days.

(21) Appl. No.: 13/545,476

(22) Filed: Jul. 10, 2012

(65) Prior Publication Data

US 2013/0022479 A1    Jan. 24, 2013

(30) Foreign Application Priority Data

Jul. 22, 2011   (EP) ..................................... 11175071

(51) Int. Cl.
*F04D 25/08*   (2006.01)
*H02K 5/20*   (2006.01)
(Continued)

(52) U.S. Cl.
CPC ........... *F04D 25/082* (2013.01); *F04D 29/584* (2013.01); *F04D 29/5813* (2013.01); *H02K 5/20* (2013.01); *H02K 9/06* (2013.01)

(58) Field of Classification Search
CPC .................. F04D 25/082; F04D 29/584; F04D 29/5813; F04D 29/588; F04D 19/002;
(Continued)

(56) References Cited

U.S. PATENT DOCUMENTS 1,843,786 A * 2/1932 Robinson ....................... 415/119
2,321,126 A * 6/1943 Breuer .................. F04D 25/082
                                                        310/57
(Continued)

FOREIGN PATENT DOCUMENTS

EP    0 992 692 A1    4/2000
EP    1 050 682 A2   11/2000
(Continued)

OTHER PUBLICATIONS http://www-mdp.eng.cam.ac.uk/web/library/enginfo/textbooks_dvd_only/DAN/motors/steady/steady.html[Sep. 6, 2015 3:45:37 PM].*
European Search Report—Dec. 27, 2011.

*Primary Examiner* — Alexander Comley
*Assistant Examiner* — Joseph Herrmann
(74) *Attorney, Agent, or Firm* — Brinks Gilson & Lione (57) ABSTRACT

An axial fan, having an inner electric motor and a fan wheel connected to the electric motor so as to rotate with it and has a plurality of wheel blades defining a blade length and extend outwardly from the electric motor. A fan housing surrounds the fan wheel. The fan housing is connected to the motor via holding struts which extend to the outside from the motor to the fan housing. A motor housing is provided on the motor behind the fan wheel and accommodates a motor electronics system. A flow duct having an inflow opening and an outflow opening is fastened to the motor behind the fan wheel such that the inflow opening is arranged offset to the outside with respect to the outflow opening. The outflow opening is oriented in such a way that an air flow which exits the outlet opening is guided onto the motor housing.

15 Claims, 6 Drawing Sheets

(51) Int. Cl.
*H02K 9/06* (2006.01)
*F04D 29/58* (2006.01)

(58) Field of Classification Search
CPC .............. F04D 25/02; F04D 25/06; F04D 25/0606; F04D 25/0686; F04D 25/08; F04D 25/12; F04D 29/403; F04D 29/52; F04D 29/522; F04D 29/541; F04D 29/545; F04D 29/547; F04D 29/58; F04D 29/582; F04D 29/587; F04D 29/5806; H02K 9/00; H02K 9/02; H02K 9/04; H02K 9/06; H02K 5/20; Y10T 403/69; F01P 1/00; F01P 1/02; F01P 1/06; F01P 5/00; F01P 5/02; F01P 7/00; F01P 7/02; F01P 7/048; F01P 7/06; F01P 7/081; F01P 7/084; F01P 9/04; F01P 11/10
USPC .............. 417/366, 369, 371, 386, 391, 368; 310/58, 60 A, 60 R, 63, 91, 88
See application file for complete search history.

(56) References Cited

U.S. PATENT DOCUMENTS

| | | | | |
|---|---|---|---|---|
| 2,394,517 A * | 2/1946 | Ingalls | | 417/367 |
| 2,397,171 A * | 3/1946 | Troller et al. | | 417/368 |
| 4,374,530 A * | 2/1983 | Walling | | 138/110 |
| 4,374,596 A * | 2/1983 | Schlemmer et al. | | 285/305 |
| 4,523,780 A * | 6/1985 | Cheer | | 285/399 |
| 4,668,898 A * | 5/1987 | Harms | | H02K 11/33 310/227 |
| 4,795,197 A * | 1/1989 | Kaminski et al. | | 285/12 |
| 4,951,716 A * | 8/1990 | Tsunoda et al. | | 138/162 |
| 5,131,352 A * | 7/1992 | Hoshino et al. | | 123/41.49 |
| 5,399,070 A * | 3/1995 | Alizaden | | 416/189 |
| 5,624,234 A * | 4/1997 | Neely et al. | | 416/238 |
| 5,955,803 A * | 9/1999 | Gandhi et al. | | 310/52 |
| 6,003,195 A * | 12/1999 | Whitney | | 15/314 |
| 6,034,451 A * | 3/2000 | El Mayas | | 310/63 |
| 6,050,786 A * | 4/2000 | Lin | | F04D 29/584 417/366 |
| 6,342,741 B1 * | 1/2002 | Fukui et al. | | 310/60 A |
| 6,384,494 B1 * | 5/2002 | Avidano et al. | | 310/58 |
| 6,924,979 B2 * | 8/2005 | Clements | | H05K 7/20172 310/68 R |
| 7,132,772 B2 * | 11/2006 | Takeuchi | | H02K 5/10 310/59 |
| 2006/0147322 A1 * | 7/2006 | Lee | | F04D 25/082 417/366 |
| 2007/0237626 A1 * | 10/2007 | Pouysegur | | 415/144 |
| 2009/0232645 A1 * | 9/2009 | Schiel | | 415/177 |
| 2010/0158713 A1 * | 6/2010 | Suzuki et al. | | 417/366 |

FOREIGN PATENT DOCUMENTS

| | | | |
|---|---|---|---|
| FR | 2 433 846 | | 3/1980 |
| IT | EP-0 992 692 | * | 4/2000 |
| JP | 2003-166498 | | 6/2003 |

* cited by examiner

AXIAL FAN WITH ADDITIONAL FLOW CHANNEL

CROSS REFERENCE TO RELATED APPLICATION

This application claims priority to European Patent Application No. 11175071.7-1267, filed Jul. 22, 2011.

FIELD OF THE INVENTION

The present invention relates to an axial fan, consisting of an inner electric motor and a fan wheel which is connected fixedly to the electric motor so as to rotate with it and has a plurality of wheel blades which have a blade length and extend to the outside from the electric motor, and, in particular, having a fan housing which surrounds the fan wheel circumferentially and is connected to the motor via at least two holding struts which extend to the outside from the motor to the fan housing, and having a motor housing which is formed on the motor behind the fan wheel in the flow direction, in particular for accommodating a motor electronics system.

BACKGROUND OF THE INVENTION

Axial fans of the above described type are generally known. In such axial fans, the flow of the flow medium detaches from the hub region with increasing back-pressure and with increasing motor loading, which results in the problem that an electronics system which is located in the motor housing is cooled poorly at the critical use point, since the flow medium which flows through the axial fan flows poorly onto the motor housing. A complicating factor is often, in addition, that a protective screen is arranged between the fan wheel and the holding struts, and the protective-screen suspension means is provided to with a large fastening flange. As a result of the presence of the fastening flange, the incident flow onto the motor housing is impaired further.

The present invention is based on the object of configuring a known axial fan in such a way that the incident flow onto the motor housing and therefore the cooling of the latter are improved.

SUMMARY OF THE INVENTION

According to the present invention, the objects are achieved by virtue of the fact that a flow duct having an inflow opening and an outflow opening is fastened to the motor behind the fan wheel in the flow direction of the flow medium, in such a way that the inflow opening is arranged offset to the outside with respect to the outflow opening. The outflow opening being oriented in the direction of the motor housing in such a way that air flow which exits the outflow opening is directed onto the motor housing. It can be expedient here if the flow duct extends rectilinearly in the radial direction or the flow duct is formed obliquely or arcuately in such a way that the inflow opening is arranged radially and circumferentially offset with respect to the outflow opening. It is expedient here, in particular, if the center of the inflow opening lies at least at a radial spacing from the circumference of the motor hub, which spacing is a third of the length of the wheel blades. The invention is based in part on the finding that an approaching flow speed of the flow medium out of the flow duct onto the motor housing results via the pressure difference between the inflow opening into the flow duct and the outflow opening, which approaching flow speed considerably increases the thermal transfer in comparison with natural convection. The inflow opening should advantageously lie in a region which has a spacing to the outside from the motor hub, which spacing is two thirds the length of the wheel blades. This is because the circumferential speed increases as the radius of the fan wheel gets larger, as a result of which a greater volumetric flow can flow into the inflow opening. In the case of small volumetric flows, the inflow opening can migrate in the direction of the motor housing, that is to say smaller spacings of the inflow opening from the motor hub can then be realized here.

According to the invention, the flow duct can be configured as a separate component; it can be fastened on the outside on the respective holding strut, or else a flow duct according to the invention can also be integrated into the respective holding strut. The flow duct can be fastened, for example, by being clipped in, or else by being attached by way of suitable fastening means. As an alternative, the flow duct can also be fastened directly to the motor housing or a fastening flange of the motor housing.

BRIEF DESCRIPTION OF THE DRAWINGS

Advantageous embodiments of the invention are described herein and will be explained in greater detail using the appended drawings, in which.

DETAILED DESCRIPTION OF THE INVENTION

In FIGS. 1 to 10, identical parts or functionally identical parts are identified by the same reference numerals. If individual features, which are described and/or can be gathered from the drawings, of the axial fan according to the invention or its constituent parts are described only in conjunction with an exemplary embodiment, they are also essential according to the invention, however, independently of the exemplary embodiment, as an individual feature or else in combination with other features of the individual exemplary embodiments, and are claimed as belonging to the invention.

Figure 1:
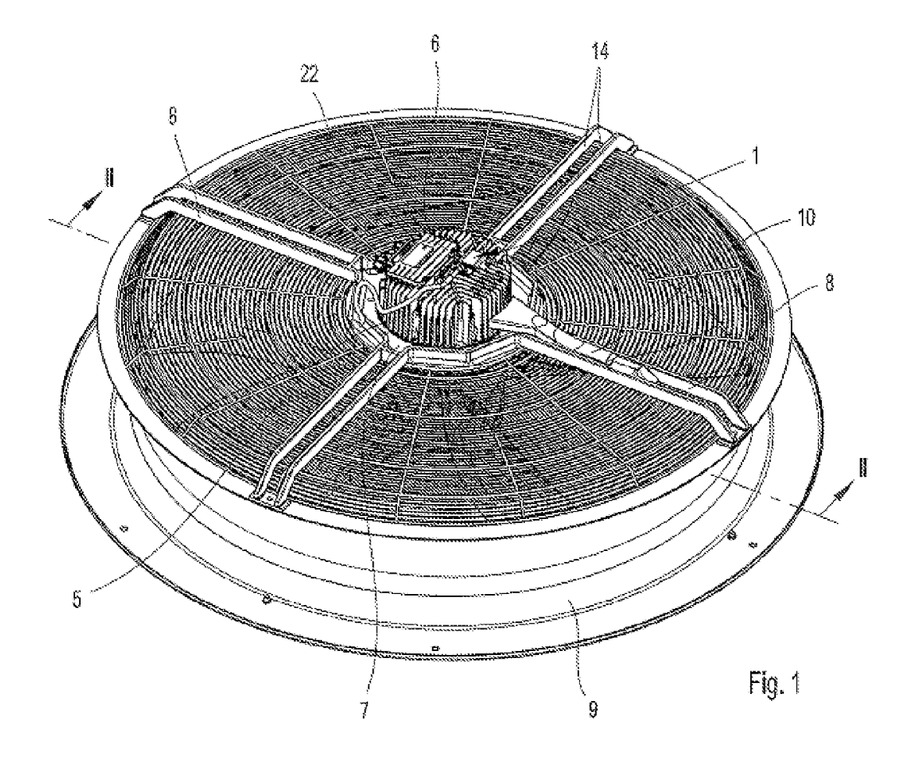
FIG. 1 shows a perspective view of an axial fan according to the invention.

As can be gathered from FIG. 1, an axial fan according to the invention consists of an inner motor 1, in particular an electric motor. A fan wheel 2 is connected fixedly to the motor 1 so as to rotate with it. The fan wheel 2 has a plurality of outwardly extending wheel blades 3 of a defined length L, measured from their inner root, by way of which they are fastened to the motor 1, as far as their outer edge. In the exemplary embodiment which is shown, the electric motor 1 is configured as an external-rotor motor and has a cup-shaped motor hub 4 which is connected fixedly to a rotor shaft. The wheel blades 3 are fastened to the outer circumference of the motor hub 4. Otherwise, the motor which is shown is configured in a known way. Behind the wheel blades 3 in the flow direction X of a flowing medium (such as air), the motor 1 has a motor housing 5, in which the motor controller is arranged with its motor electronics system. On its outer side, the motor housing 5 expediently has a cooling structure 6 which is formed from individual fins. At the end of the motor hub 4 and at the beginning of the motor housing 5, as viewed in the flow direction X, the motor housing 5 has an annular fastening flange 7, to which holding struts 8 are fastened which serve for the end-side fastening of a fan housing 9 which encloses the fan wheel 2 circumferentially. According to the invention, at least one flow duct 10 having an inflow opening 12 at one end and an outflow opening 13 at the other end is fastened indirectly or directly to the motor 1 behind the fan wheel 2 in the flow direction X of the flow medium, in such a way that, starting from the motor housing 5, the flow duct 10 extends radially rectilinearly in the direction of the fan housing 9 or rectilinearly radially to the outside, the outflow opening 13 being located in the vicinity of the motor housing 5 and facing the latter in such a way that the air flow which exits the outflow opening 13 is directed onto the motor housing 5, and the centre of the inflow opening 12 lies at least at a spacing from the circumference of the motor hub 4, which spacing is a third of the length L of the wheel blades 3, wherein:

$$L=(D1-D2)/2,$$

And in which D2 is the external diameter of the motor hub 4 and D1 is the diameter of a circumference around the outer end of the wheel blades 3. This takes into consideration the fact that the wheel blades 3 can be, for example, of curved configuration and/or can be configured with a curved outer edge. A cooling duct is defined by the flow duct 10 according to the invention, through which cooling duct the outlet air of the axial fan is guided onto the outer circumference of the motor housing 5, and the result of the pressure difference between the inlet side and the outlet side of the flow duct 10 is an approaching flow speed in the region of the motor housing 5, which approaching flow speed considerably increases the thermal transfer in comparison with natural convection.

According to the invention, the flow duct 10 can be integrated, for example, into one of the struts 8, with the result that the strut itself is configured as a flow duct 10. In the exemplary embodiment which is shown, the flow duct 10 is of tubular configuration as an additional part. The inflow opening 12 is expediently configured in such a way that it is oriented counter to the flow direction X (i.e. facing it), with the result that the complete opening cross section is available for the air which flows through the axial fan or the medium which flows through the axial fan. Furthermore, it is expedient if the outflow opening 13 forms an opening gap which extends over a part circumference of the motor housing 5, as is shown in the exemplary embodiments shown of the flow duct 10 according to the invention, so that an arcuate opening contour of the outflow opening 13 results, the arc radius being adapted to the curvature radius of the motor housing 5. This can be seen, in particular, from FIGS. 1 and 9, for example.

Figure 2:
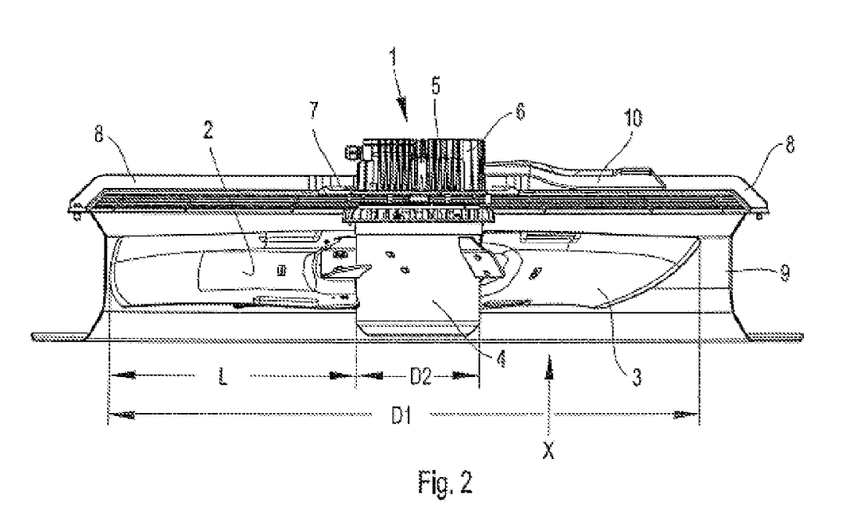
FIG. 2 shows a part section along the sectional line II-II in FIG. 1.

As is shown in FIGS. 1 and 2, the flow duct 10 according to the invention is fastened as an additional component to one of the holding struts 8. Here, the holding struts 8 are formed from two webs 14 which extend in parallel and between which the flow duct 10 is inserted and is fastened, for example, by a positively locking connection, in particular a clip connection. The flow duct 10 is expediently produced in a tubular shape, in a single piece or multiple pieces. In the exemplary embodiment which is shown, the flow duct 10 has a rectangular cross section and has a front wall 15, a rear wall 16 and two side walls 17 which connect the two walls 15, 16. However, it does not have to be an exactly rectangular cross section. There can also be a square or trapezoidal cross section. There can also be flow-duct sections with a different cross-sectional shape.

In its end region which has the outflow opening 13, the flow duct 10 has an outflow funnel section 18 which widens to the outflow opening 13. The end section which has the outflow opening 13 is angled off with respect to the remaining section of the flow duct 10 in such a way that, in the fastened state, it is arranged above or outside the holding strut 8, whereas the remaining section of the flow duct 10 extends in a recessed manner in the holding strut 8, in particular between the webs 14. As can be seen, furthermore, it can be expedient to configure the rear-wall section 19 together with a side wall 17 in the region of the inflow opening 12 in such a way that an additional opening 20 is formed. The additional opening 20 extends into the side wall 17. Here, the additional opening 20 is arranged on that side of the flow duct 10 which, as viewed in the rotational direction of the wheel blades 3, is swept over first by the blade leading edges. Above the additional opening 20, the rear-wall section 19 has an extension section 19a which serves to divert the air which flows through the axial fan in the additional opening 20. Here, the extension section 19a and the rear-wall section 19 are arranged and shaped in such a way that the result is as little eddying as possible in the flow, in order to avoid flow losses and undesired flow noise. The effective inflow cross section is enlarged by the said additional opening 20. The flow duct 10 has an end-side front wall 21 which is of bevelled configuration in the direction of the opposite end, as a result of which an inner oblique incident flow surface is produced which improves the inflow behaviour within the flow duct 10. In the example which is shown, a protective screen 22 is arranged between the fan wheel 2 and the holding struts 8, which protective screen 22 is fastened between the fastening flange 7 and the housing 5.

Figure 5:
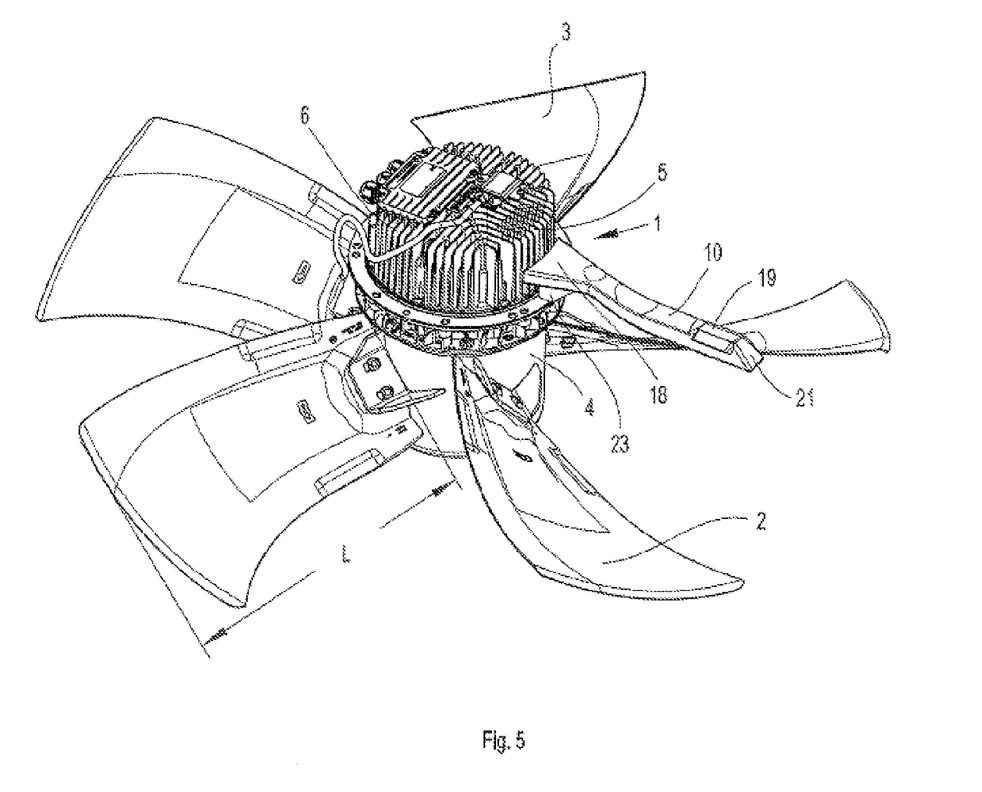
FIG. 5 shows a view of an axial fan according to the invention in an alternative embodiment.

FIG. 5 shows an embodiment of an axial fan according to the invention, in which there is no fan housing 9 and in which holding struts 8 are therefore also missing. In an embodiment of this type, the flow duct 10 is screwed or clipped directly to the annular fastening flange 7 via a fastening attachment 23 on its rear wall in the region of the outflow opening 13, and extends radially to the outside from the motor 1.

Figure 6:
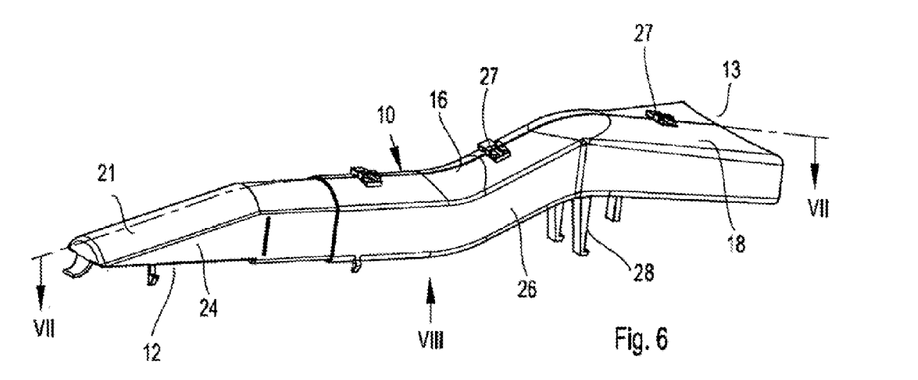
FIG. 6 shows a view of a flow duct according to the invention in an alternative embodiment.
Figure 7:
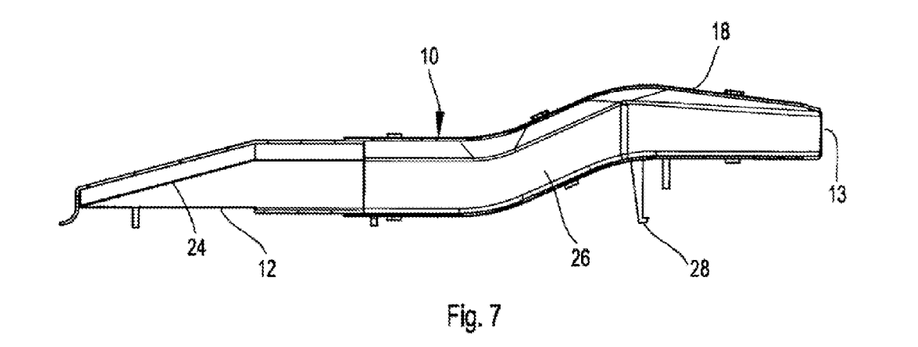
FIG. 7 shows a section along the sectional line VII-VII in FIG. 6.
Figure 8:
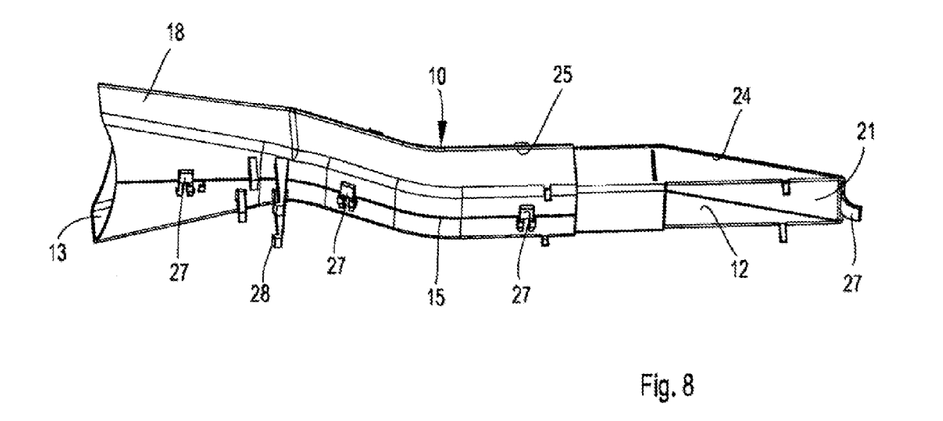
FIG. 8 shows a view of a flow duct according to the invention according to FIG. 6 in the arrow direction VIII.

FIGS. 6 to 8 show a further embodiment of a flow duct 10 according to the invention. In this exemplary embodiment, the flow duct 10 consists of three parts, namely a first part 24 which has the inflow opening 12, and a second and a third part 25, 26 which are configured in each case as half shells and can be joined to one another via latching connections 27 which are formed on the duct front wall 15 and the rear wall 16, to form a closed duct. Before the two half-shell parts 25, 26 are joined together, the first part 24 which has the inflow opening 12 is pushed between the half-shell parts 25, 26 into the end which lies opposite the outflow opening 13, and is fixed via a latching connection 27 in the rear wall 16 of the flow duct 10, with the result that, in the joined state of the half-shell parts 25, 26, the first part 24 forms the flow duct 10 together with the section which is formed from the half-shell parts 25, 26. Lying opposite the inflow opening 12, the end wall 21 of the first part 24 is bevelled in the direction of the outflow opening 13 over the entire length of the inflow opening 12, with the result that an oblique surface is produced in the interior lying opposite the inflow opening 12, as a result of which improved flow behaviour is achieved during the inflow of the medium. Latching projections 28 are formed on the underside of the flow duct 10, by way of which latching projections 28 the flow duct 10 is fastened to the holding strut 8.

Figure 3:
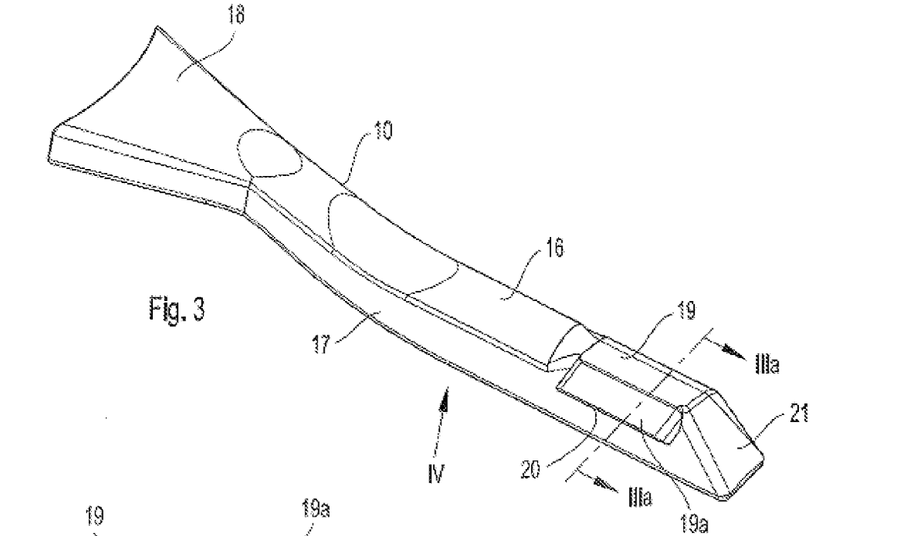
FIG. 3 shows a perspective view of a flow duct according to the invention.
Figures 3A, 4:
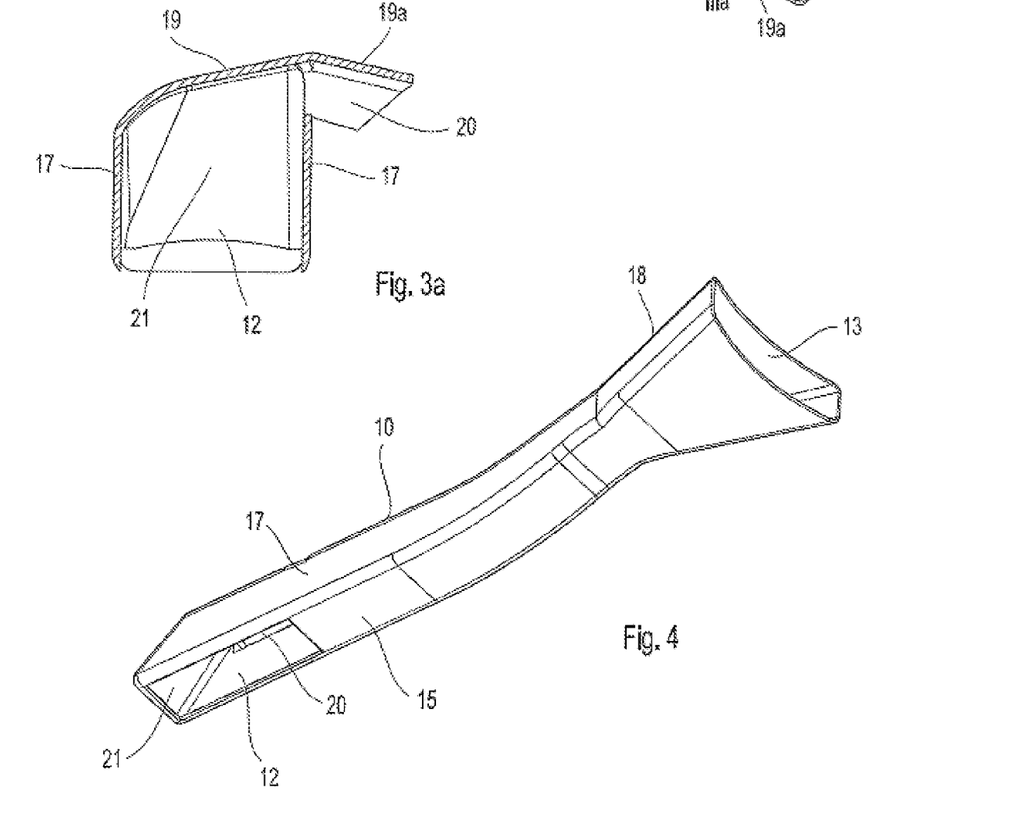
FIG. 3a shows a section along the sectional line IIIa-IIIa in FIG. 3.
FIG. 4 shows a view according to the arrow IV in FIG. 3.

Otherwise, the flow duct 10 which is shown is configured in accordance with the flow duct 10 according to FIGS. 3, 3a and 4.

Figure 9:
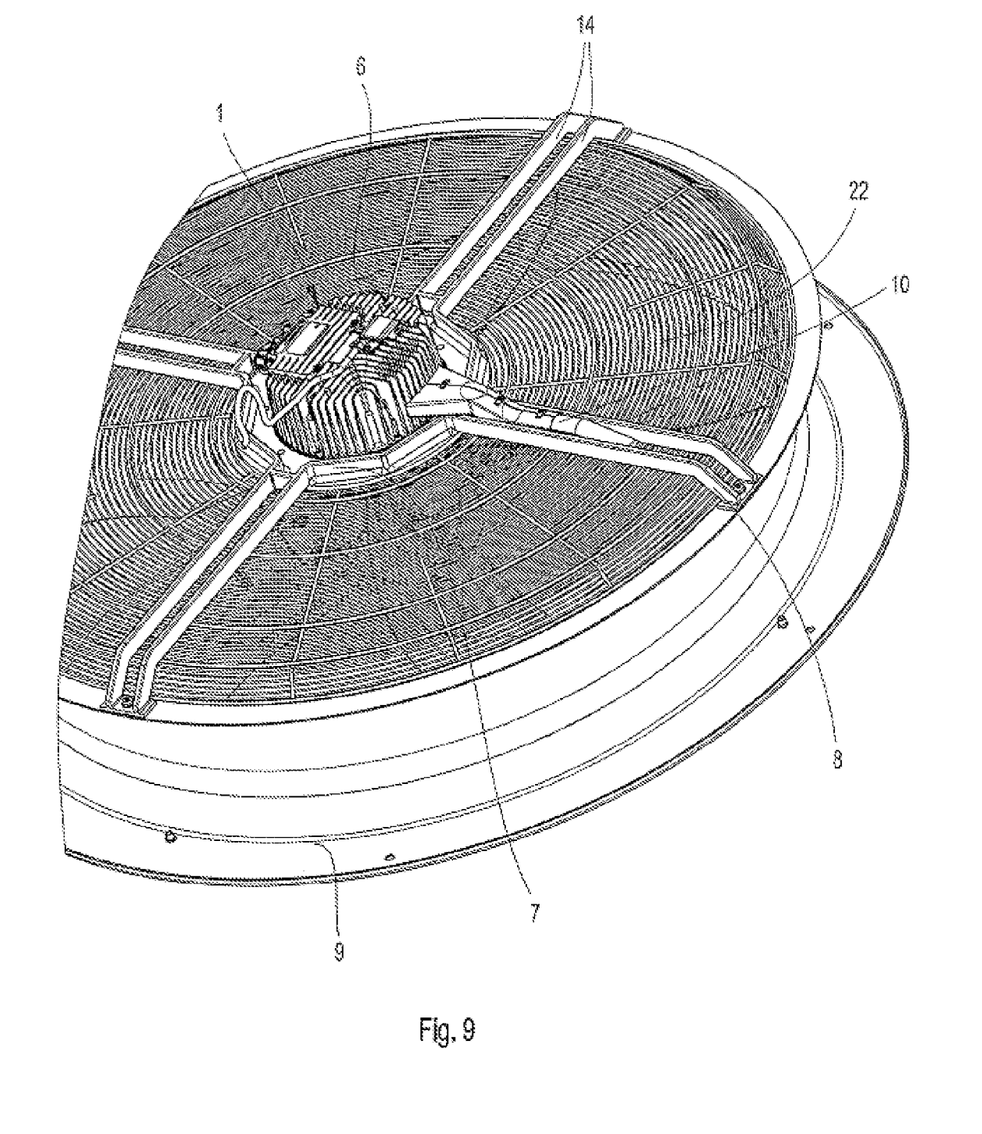
FIG. 9 shows a part view of an axial fan according to the invention using a flow duct according to FIG. 6.

FIG. 9 shows how the flow duct 10 according to FIGS. 6 to 8 is arranged within a holding strut 8.

Figure 10:
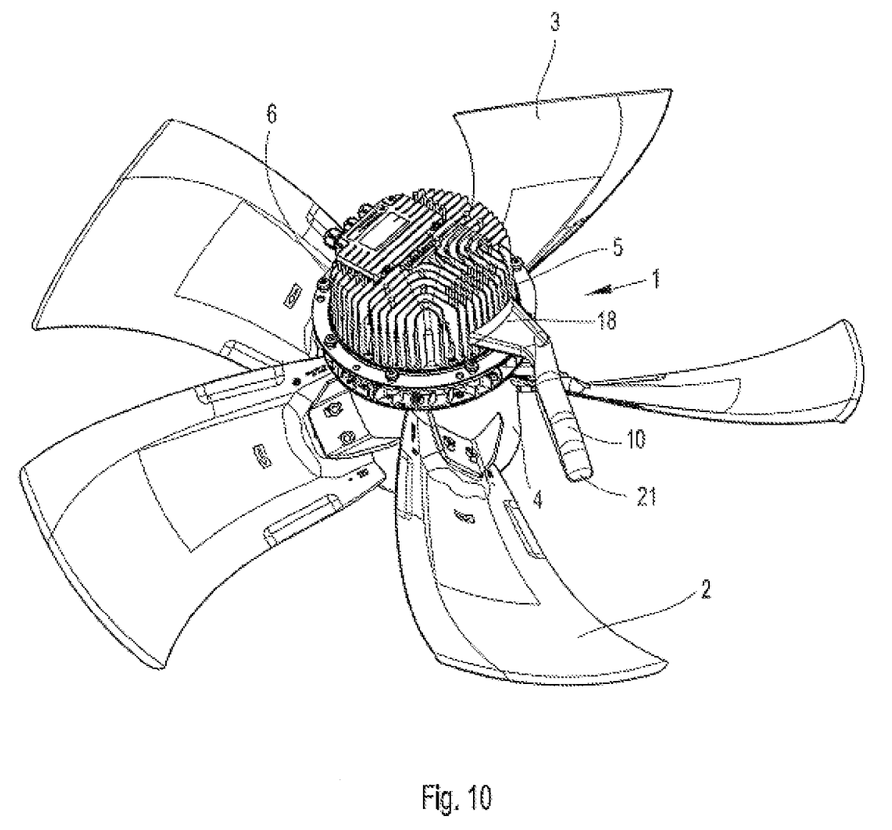
FIG. 10 shows a view of an axial fan according to the invention in a further alternative embodiment.

FIG. 10 shows a further embodiment and arrangement of a flow duct 10 according to the invention, it being possible for the flow duct 10 which is shown in FIG. 10 to likewise have the features described with respect to FIGS. 1 to 9, individually or in combination. The flow duct 10 is arranged and configured so as to extend obliquely in such a way that its inflow opening 12 is arranged offset radially and circumferentially with respect to its outflow opening 13. This radial and circumferential offset of the outflow opening 13 with respect to the inflow opening 12 can be effected in the rotational direction of the fan wheel 2 or else counter to the rotational direction of the fan wheel 2. It likewise lies within the scope of the present invention if the obliquely extending flow duct 10 does not extend rectilinearly as shown in FIG. 10, but rather is of arcuate configuration.

It likewise lies within the scope of the present invention if a flow duct 10 according to the invention is arranged in a plurality of holding struts 8 or is connected to the holding struts 8. There can also be a plurality of flow ducts 10 in the embodiment according to FIG. 5.

The arrangement of the inflow opening 12 in relation to the length L of the wheel blades 3 is such that the centre of the inflow opening 12 is at a spacing from the motor hub 4, which spacing is a third of the length L of the wheel blades 3. The optimum arrangement of the inflow opening 12 is at a spacing from the circumference of the motor hub 4, which spacing is two thirds of the length L of the wheel blades 3. The arrangement of the inflow opening 12 also depends on the desired volumetric flow which is to be guided through the flow duct 10 onto the motor housing 5; the further the inflow opening 12 is displaced to the outside, the greater a volumetric flow can be guided through the flow duct 10, since there is a higher circumferential speed of the wheel blades 3 on the outside, as a result of which a greater volumetric flow is also produced. In the case of a smaller desired volumetric flow, the inflow opening 12 can migrate inwards; however, the spacing of the centre of the inflow opening 12 is not to be smaller than a third of the length L of the wheel blades 3, measured from the circumference of the motor hub 4. The refinement according to the invention with a flow duct 10 can also be realized independently of the presence of a protective screen 22 of a housing and of holding struts 8. In this case, the flow duct 10 is fastened by way of connecting means to the motor housing 5 which contains the motor electronics system. The present invention ensures that reliable cooling of the motor housing 5 which contains the motor electronics system is achieved even in the case of an increasing back-pressure.

While the above description constitutes the preferred embodiment of the present invention, it will be appreciated that the invention is susceptible to modification, variation, and change without departing from the proper scope and fair meaning of the accompanying claims.

The invention claimed is:

1. An axial fan comprising:
   an inner electric motor,
   a fan wheel which is connected fixedly to the electric motor so as to rotate with the electric motor and having a plurality of wheel blades which have a blade length and extend radially outward from the electric motor,
   a fan housing which surrounds the fan wheel circumferentially and is connected to the electric motor via at least two holding struts which extend radially outward from the electric motor to the fan housing,
   a motor housing which is formed on the electric motor behind the fan wheel in the flow direction of a flow medium for accommodating a motor controller with a motor electronics system, the motor housing having an outside with a cooling structure formed by individual fins,
   a tubular flow duct having an inflow opening and an outflow opening fastened to the electric motor behind the fan wheel in the flow direction of the flow medium, in such a way that the inflow opening is arranged offset radially outward with respect to the outflow opening, the outflow opening being located near the motor housing and facing the motor housing in such a way that the outflow opening directs an air flow which exits the outflow opening onto the outside of the motor housing, the tubular flow duct being arranged as an additional component in at least one of the two holding struts or integrated in one piece into the at least one of the two holding struts,
   wherein the outflow opening forms an opening gap which extends over a part of a circumference of the motor housing, and
   wherein the inflow opening has a center radially spaced apart from a circumference of a motor hub by a spacing amounting to one third through two thirds of a length L of the wheel blades,
   wherein the length $$L = \frac{D1 - D2}{2}$$

with D2 being an external diameter of the motor hub and D1 being a diameter of a circumference around outer ends of the wheel blades.

2. The axial fan according to claim 1, wherein the tubular flow duct extends rectilinearly in the radial direction.

3. The axial fan according to claim 1, wherein the tubular flow duct is formed and arranged obliquely or arcuately in such a way that the inflow opening is arranged radially and circumferentially offset with respect to the outflow opening.

4. The axial fan according to claim 1, wherein the inflow opening of the tubular flow duct is oriented counter to the flow direction of the flow medium.

5. The axial fan according to claim 1, wherein the tubular flow duct is fastened as an additional component to the motor housing.

6. The axial fan according to claim 1, wherein the tubular flow duct is fastened to the holding strut by being attached or by a positively locking connection.

7. The axial fan according to claim 1, wherein the outflow opening directs the airflow onto the cooling structure on the motor housing.

8. The axial fan according to claim 1, further comprising a protective screen arranged between the fan wheel and the holding struts.

9. The axial fan according to claim 1, wherein the tubular flow duct is configured as an additional component, is rectangular in cross section and has a front wall, a rear wall and two side walls which connect the front and rear walls.

10. The axial fan according to claim 9, wherein the rear wall is configured in the region of the inflow opening in such a way that a rear-wall section forms an additional opening together with one of the side walls, which additional opening is arranged on that side of the tubular flow duct which is swept over first by the blade leading edges during rotation of the wheel blades.

11. The axial fan according to claim 10, wherein the rear-wall section above the additional opening has an extension section which serves to divert the air which flows through the axial fan into the additional opening.

12. The axial fan according to claim 1, wherein the outflow opening is formed in an outflow funnel section which widens towards the outflow opening and is offset by an angled-off section with respect to the remaining section of the tubular flow duct in such a way that, in a state in which the tubular flow duct is inserted in the holding strut, the outflow opening is arranged above and outside the holding strut.

13. The axial fan according to claim 1, wherein the tubular flow duct has an end-side front wall which is configured so as to be beveled in the direction of the opposite end of the tubular flow duct, with the result that an inner oblique incident flow surface is formed.

14. The axial fan according to claim 1, wherein the tubular flow duct is formed from a first part which has the inflow opening, and a second and a third part which are configured as half shells and are joined to one another via latching connections which are formed on a duct front side and a rear wall of the tubular flow duct, to form a closed duct.

15. An axial fan comprising:
an inner electric motor and a fan wheel which is connected fixedly to the electric motor so as to rotate with the electric motor and having a plurality of wheel blades which have a blade length and extend radially outward from the electric motor, a fan housing which surrounds the fan wheel circumferentially and is connected to the electric motor via at least two holding struts which extend radially outward from the electric motor to the fan housing, and having a motor housing which is formed on the electric motor behind the fan wheel in the flow direction of a flow medium for accommodating a motor controller with a motor electronics system, a tubular flow duct having an inflow opening and an outflow opening fastened to the electric motor behind the fan wheel in the flow direction of the flow medium, in such a way that the inflow opening is arranged offset radially outward with respect to the outflow opening, the outflow opening being oriented in the direction of the motor housing in such a way that an air flow which exits the outflow opening is guided onto the motor housing, wherein the outflow opening forms an opening gap which extends over a part of a circumference of the motor housing, and wherein the inflow opening has a center radially spaced apart from a circumference of a motor hub by a spacing amounting to one third through two thirds of a length L of the wheel blades, wherein the length $$L = \frac{D1 - D2}{2}$$

with D2 being an external diameter of the motor hub and D1 being a diameter of a circumference around outer ends of the wheel blades, wherein the tubular flow duct is formed from a first part which has the inflow opening, and a second and a third part which are configured as half shells and are joined to one another via latching connections which are formed on a duct front side and a rear wall of the tubular flow duct, to form a closed duct, and wherein the first part is pushed in between the half-shell second and third parts of the tubular flow duct; and the first part is fixed via the latching connection in the rear wall of the tubular flow duct.

\* \* \* \* \*